(12) United States Patent
Natrajan et al.

(10) Patent No.: US 10,075,476 B2
(45) Date of Patent: Sep. 11, 2018

(54) REUSABLE ZONE

(71) Applicant: Hewlett Packard Enterprise Development LP, Houston, TX (US)

(72) Inventors: Balaji Natrajan, Spring, TX (US); Sohail Hameed, Houston, TX (US); Pruthviraj Herur Puttaiah, Tomball, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 146 days.

(21) Appl. No.: 15/024,701

(22) PCT Filed: Sep. 27, 2013

(86) PCT No.: PCT/US2013/062171
§ 371 (c)(1),
(2) Date: Mar. 24, 2016

(87) PCT Pub. No.: WO2015/047296
PCT Pub. Date: Apr. 2, 2015

(65) Prior Publication Data
US 2016/0234257 A1    Aug. 11, 2016

(51) Int. Cl.
*H04L 29/06* (2006.01)
*G06F 3/06* (2006.01)
(Continued)

(52) U.S. Cl.
CPC ............ *H04L 63/20* (2013.01); *G06F 3/0637* (2013.01); *G06F 21/62* (2013.01); *H04L 63/104* (2013.01);
(Continued)

(58) Field of Classification Search
CPC ..... H04L 63/104; G06F 21/62; G06F 3/0637; G06F 2213/0028
See application file for complete search history.

(56) References Cited

U.S. PATENT DOCUMENTS 7,502,865 B2    3/2009  Seto
7,644,304 B2    1/2010  Kotzur et al.
(Continued)

FOREIGN PATENT DOCUMENTS

| CN | 102571554 | 7/2012 |
| CN | 102771094 | 11/2012 |
| CN | 103179471 | 6/2013 |

OTHER PUBLICATIONS

Liao et al., "Managing Access Control Through SAS Zoning", 17 pages (Year: 2005).*
(Continued)

*Primary Examiner* — Thaddeus J Plecha
(74) *Attorney, Agent, or Firm* — Hewlett Packard Enterprise Patent Department

(57) ABSTRACT

Implementations of the disclosed technology may respond to a discovery request according to the origination of the discovery request. In these implementations, a discovery request for a connection to a device assigned to a reusable zone may be obtained. If the discovery request does not originate from a local switch group, the discovery response may indicate that there is no device at the connection.

20 Claims, 5 Drawing Sheets

(51) Int. Cl.
  *G06F 21/62* (2013.01)
  *H04L 29/08* (2006.01)
(52) U.S. Cl.
  CPC ........ *H04L 63/107* (2013.01); *H04L 67/1025*
    (2013.01); *G06F 2213/0028* (2013.01); *H04L*
    *67/1097* (2013.01)

(56) References Cited

U.S. PATENT DOCUMENTS

| | | | |
|---|---|---|---|
| 7,668,925 | B1 | 2/2010 | Liao et al. |
| 7,996,509 | B2 | 8/2011 | Basham et al. |
| 8,051,436 | B2 | 11/2011 | Jones |
| 8,074,105 | B2 | 12/2011 | Kalwitz et al. |
| 2004/0218593 | A1* | 11/2004 | Hammons ............... H04L 63/10 370/386 |
| 2005/0018619 | A1 | 1/2005 | Banks et al. |
| 2007/0162592 | A1* | 7/2007 | Marks ................... G06F 3/0605 709/224 |
| 2008/0120687 | A1 | 5/2008 | Johnson |
| 2009/0083484 | A1 | 3/2009 | Basham et al. |
| 2010/0036948 | A1 | 2/2010 | Cassiday et al. |
| 2011/0149963 | A1 | 6/2011 | Hamilton et al. |
| 2012/0158942 | A1 | 6/2012 | Kalusivalingam et al. |
| 2013/0117767 | A1 | 5/2013 | Myrah et al. |
| 2013/0163591 | A1 | 6/2013 | Shukla et al. |
| 2016/0011780 | A1* | 1/2016 | Washiya ............... G06F 3/0613 710/5 |

OTHER PUBLICATIONS

Fairchild, Steven, "SAS Expander Initiator Based Configuration," Jul. 12, 2002, See pp. 17-21. ftp://147.145.44.154/t10/document.02/02-280r0.pdf.

Liao, Heng. et al., "Managing Access Control Through SAS Zoning," (White Paper), PMC-Sierra, Inc., Sep. 2005., 19 pages.

PCT, "International Search Report and Written Opinion," dated Jun. 2, 2014 for PCT/US2013/062171, filed Sep. 27, 2013, HP reference 83668143, 9 pps.

International Bureau, "International Preliminary Report on Patentability," dated Apr. 7, 2016, issued in PCT App. No. PCT/US2013/062171.

* cited by examiner

REUSABLE ZONE

CROSS-REFERENCE TO RELATED APPLICATION

Pursuant to 35 U.S.C. § 371, this application is a United States National Stage Application of International Patent Application No. PCT/US2013/062171, filed on Sep. 27, 2013, the contents of which are incorporated by reference as if set forth in their entirety herein.

BACKGROUND

Zoning may be used in some networks to control access between network devices. For example, a SAS (Serial Attached Small Computer System Interface (SCSI)) domain may include initiators, such as host bus adaptors (HBAs) or controllers; targets, such as storage devices; and switches, such as expanders, connecting the initiators and devices. Zoning may be used to control which targets different initiators are able to access. In some protocols, access between zones may be controlled by a zoning policy. For example, in one implementation, devices in Zone A may be given access to devices in Zones A and B, but devices in Zone C may be only able to access devices in Zone C.

BRIEF DESCRIPTION OF THE DRAWINGS

Certain examples are described in the following detailed description and in reference to the drawings, in which.

DETAILED DESCRIPTION OF SPECIFIC EXAMPLES

Some zoning-enabled networking protocols may allow only a limited number of zones. For example, SAS version 2 (SAS-2) uses a one byte field to label zones and reserves the first 8 zones, which limits the number of customizable zones to 248. As the number of devices in a network increases, a network administrator may exhaust the number of available zones, preventing the network administrator from implementing otherwise desirable zoning schemes.

Figure 1:
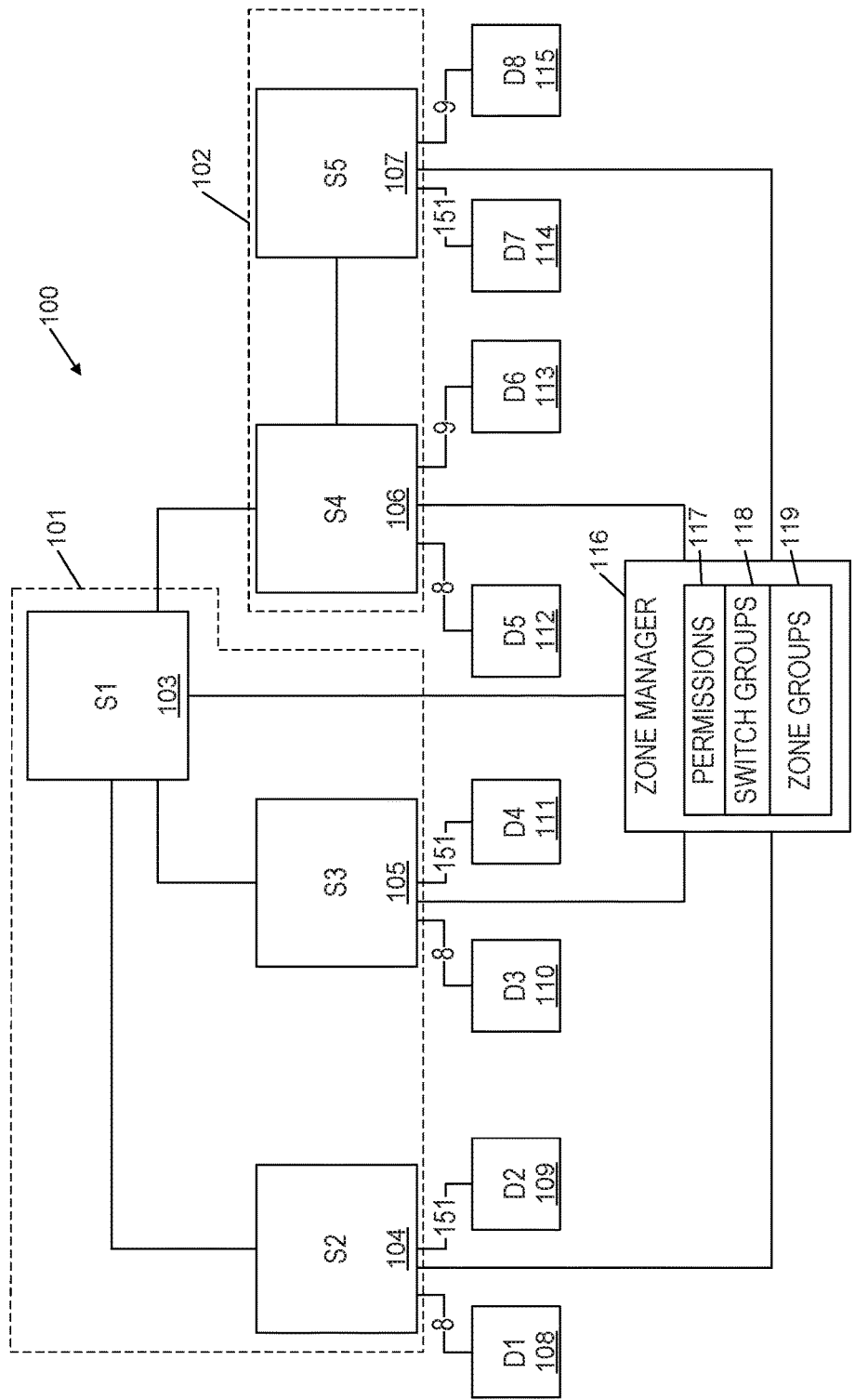
FIG. 1 illustrates an example network fabric implementation utilizing zone reuse.

Some aspects of the disclosed technology may allow zone reuse in a network. For example, FIG. 1 illustrates an example network fabric 100 implementation utilizing zone reuse. The fabric 100 includes a plurality of devices 108, . . . , 115 interconnected by switches 103, . . . , 107. For example, in a SAS fabric 100, the devices 108, . . . , 115 may include target devices and initiator devices, and the switches 103, . . . , 107 may include expanders. As another example, in an Fibre Channel (FC) or FC over Ethernet (FCoE), the switches 103, . . . , 107 may be network switches.

The fabric 100 may be divided into switch groups 101, 102. For example, switches S1 103, S2 104, S3 105 may be assigned to a first switch group 101, and switches S4 106, S5 107 may be assigned to a second switch group 102. Additionally, available zone labels may be divided into a non-reusable zone group and a reusable zone group. In the illustrated example, zones {8, . . . , 255} are available, zones {8, . . . , 150} are assigned to the reusable zone group and zones {151, . . . , 255} are assigned to the non-reusable zone group. In some implementations, zone identification numbers in the reusable zone group may be reused in each switch group 101, 102. Accordingly, in these implementations, each zone number in the reusable zone group is local to the switch groups 101, 102. Different switch groups 101, 102 may reuse the zone numbers in the reusable zone group for different zones. In contrast, in some implementations, zone identification numbers in the non-reusable are used globally across the entire fabric 100. In these implementations, only a single zone in the fabric 100 may have a zone number in the non-reusable zone group.

In some implementations, the switches 103, . . . , 107 may implement access control rules where: (1) a device in a reusable zone can access other devices in its local switch group if zone permissions otherwise allow, but cannot access devices outside its local switch group; and (2) a device in a non-reusable zone can access other devices in its local switch group and devices in non-reusable zones in other switch groups if the zone permissions otherwise allow, but cannot access devices in reusable zones outside its local switch group.

As an example, a zone manager 116 provide zone permissions 117 to the switches 103, . . . , 107—for example, in the form of permission tables—permitting devices in zones 8 and 151 to communicate with each other, and permitting devices in zones 8 and 9 to communicate with each other. In this example, device D7 114 is permitted to access device D5 112, because device D5 112 is in its local switch group 102. Additionally, device D7 114 is allowed to access device D4 111 because device D4 111 is assigned to the non-reusable zone 151. However, device D7 114 is not allowed to access devices D1 108 and D3 110 because they are assigned to reusable zone 8 and outside device D4's 111 local switch group 102. Further, device D5 112 is permitted to communicate with devices D6 113 and D8 115, because they are assigned to reusable zones and are all in the same switch group 102. However, devices D1 108 and D3 110 are not permitted to communicate with devices D6 113 and D8 115 because they are in different switch groups 101, 102. Accordingly, in this example, devices D1 108 and D3 110 are in a different zone than device D5 112, even though all three devices 108, 110, 112 have the same zone identification number. Accordingly, the zone identification number {8} has been reused in different switch groups 101, 102 of the fabric 100. In contrast, devices D2 109, D4 111, and D7 114 are in the same zone. Accordingly, the zone identification number {151} is non-reusable in the fabric 100.

In some implementations, zoning may be implemented during the discovery process to implement the access control rules. For example, device D1 108 may be connected to a transceiver n of the switch S2 104. During a discovery process, device D4 111 may send a discovery request to switch S2 to discover whether there is a device connected to transceiver n. Switch S2 104 may prevent access to device D1 by responding that there is no device connected to transceiver n.

In some implementations, the zone manager 116 may manage the assignment of switches 101, . . . , 107 into switch groups 118. For example, the zone manager 116 may obtain the switch group assignment 118 and assign each switch 103, . . . , 107 to its assigned switch group by providing a switch group identification to each switch 103, . . . , 107. Additionally, the zone manager 116 may manage the assignment 119 of available zones into reusable zone groups and non-reusable zone groups. For example, the zone manager 116 may transmit a list of the reusable zones and a list of the non-reusable zones to the each switch 103, . . . , 107.

In some implementations, the zone manager 116 may provide an input for a user to provide the switch group assignment 118 and zone group assignment 119. In other implementations, the zone manager 116 may obtain an accessibility assignment for the devices 108, . . . , 115 and may generate the switch group assignment 118 and zone group assignment 119 from the accessibility assignment. For example, a user may provide the accessibility assignment as an allocation of the devices 108, . . . , 115 into groups that are permitted to communicate. The zone manager 116 may then inspect the topology of the fabric 100 and attempt to generate a switch group assignment 118 and zone group assignment 119 that fulfills the accessibility assignment.

In some implementations, the switch groups 101, 102 are continuous. In a continuous switch group, a communication between two devices connected to the switch group does not need to be routed through a switch outside the switch group. In other implementations, the switch groups 101, 102 may be discontinuous.

Figure 2A:
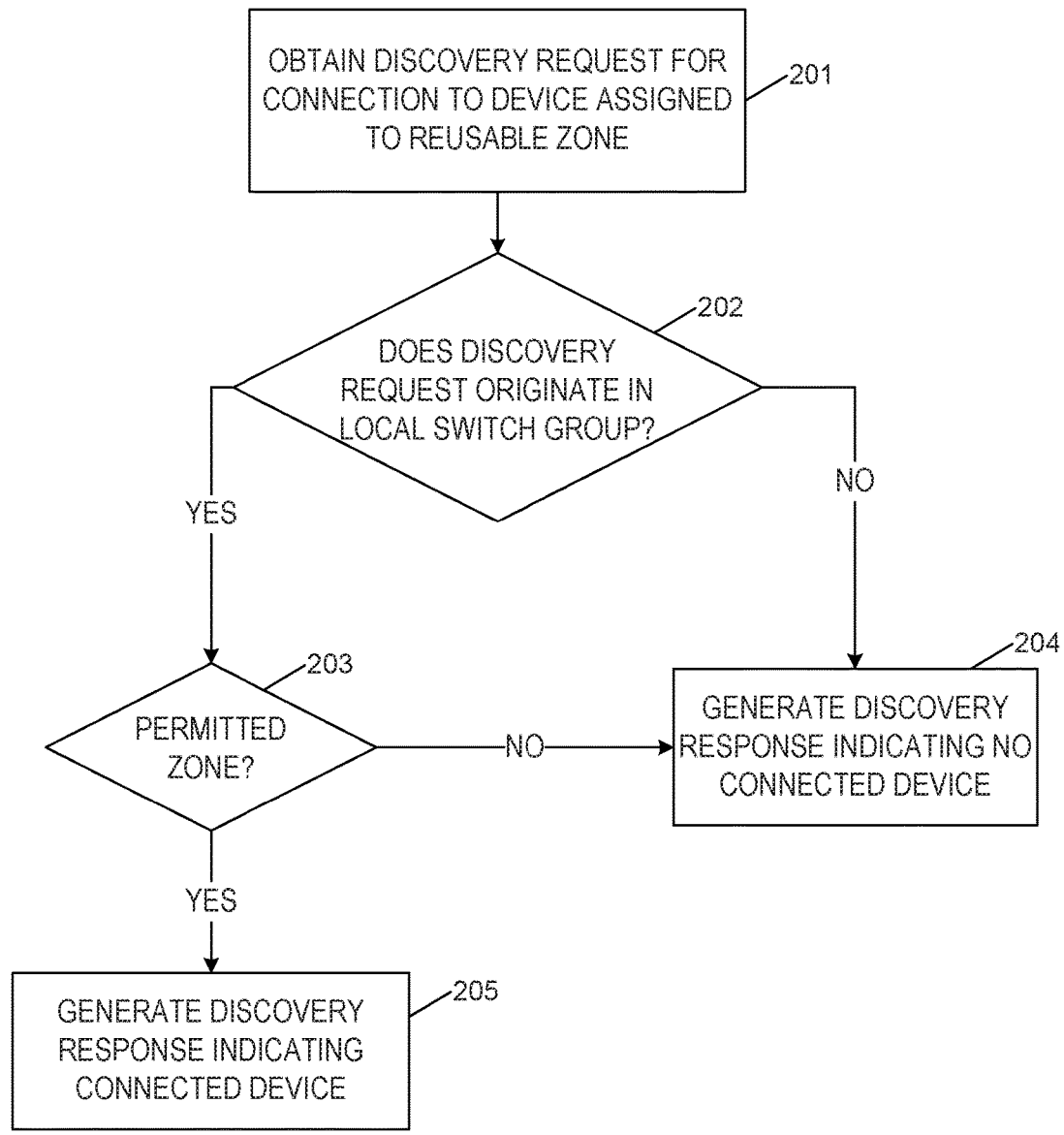
FIG. 2A illustrates an example method of providing a discovery response for a device assigned to a reusable zone.

FIG. 2A illustrates an example method of providing a discovery response for a device assigned to a reusable zone. For example, a switch in a network fabric may perform the illustrated method when receiving discovery requests from devices in the network. For example, a switch 103, . . . , 107 in a fabric 100, such as a SAS expander, as described with respect to FIG. 1 may perform the illustrated method.

Block 201 of the example method includes obtaining a discovery request for a connection to a device assigned to a reusable zone. For example, a switch performing the illustrated method may have a plurality of connections to connect to other devices or switches. For example, in a SAS fabric, an expander may perform block 201 by receiving a Serial Management Protocol (SMP) DISCOVER request for a physical or logical transceiver (PHY) connected to a device assigned to a reusable zone. As another example, a switch may perform block 201 by receiving a discovery request for a port connected to a device assigned to a reusable zone.

Block 202 of the example method includes determining if the discovery request originates in a local switch group. For example, in a SAS fabric, an expander may determine if the discovery request was transmitted by an initiator device connected to another expander in the local expander group.

In some implementations, a switch may use a switch group map to perform block 202. For example, during a topology discovery process, switches in the fabric may exchange messages to allow the switches to self-configure. For example, in a SAS fabric, expanders may exchanges SMP REPORT GENERAL messages. These configuration messages may include switch group identification information. Accordingly, the switch may determine to which switch group each other switch belongs. The switch may also discover each device on the network. For example, in a SAS fabric, the switch may discover the initiators and targets connected to the fabric. The switch may generate the switch group map by mapping each device to the switch group of the switch to which it is directly connected. Accordingly, the map may associate the device transmitting the discovery request received in block 201 with a switch group identification number. The switch may compare this switch group identification number with its own switch group identification number to determine if the discovery request originated in the local switch group.

If the discovery request does not originate from the local switch group, the example method may proceed to block 204. Block 204 may include generating a discovery response that indicates that there is no device at the connection. For example, in a SAS fabric, an expander may return a NO DEVICE ATTACHED message for the PHY listed in the SMP DISCOVER message. Accordingly, devices outside the local switch group may be prevented from discovering devices assigned to a reusable zone, which may maintain the localized nature of the reusable zone.

If the discovery request does originate from the local switch group, the example method may proceed to block 203. For example, if the discovery request originates from a second device connected to the local switch group, the example method may proceed to block 203. In block 203, the switch may determine if the requesting device is assigned to a zone permitted to access the reusable zone. For example, the switch may use a zone permission table to determine if the requesting device is assigned to a zone permitted to access the reusable zone.

If the requesting device is in a permitted zone, the method may proceed to block 205. Block 205 may include generating a discovery response that indicates that the device is connected at the connection. For example, in a SAS fabric, an expander may respond with an SMP DISCOVER RESPONSE frame with information regarding the PHY and the device attached to the PHY.

If the requesting device is not in a permitted zone, the method may proceed to block 204. As described above, block 204 may include generating a discovery response that indicates that there is no device at the connection.

Figure 2B:
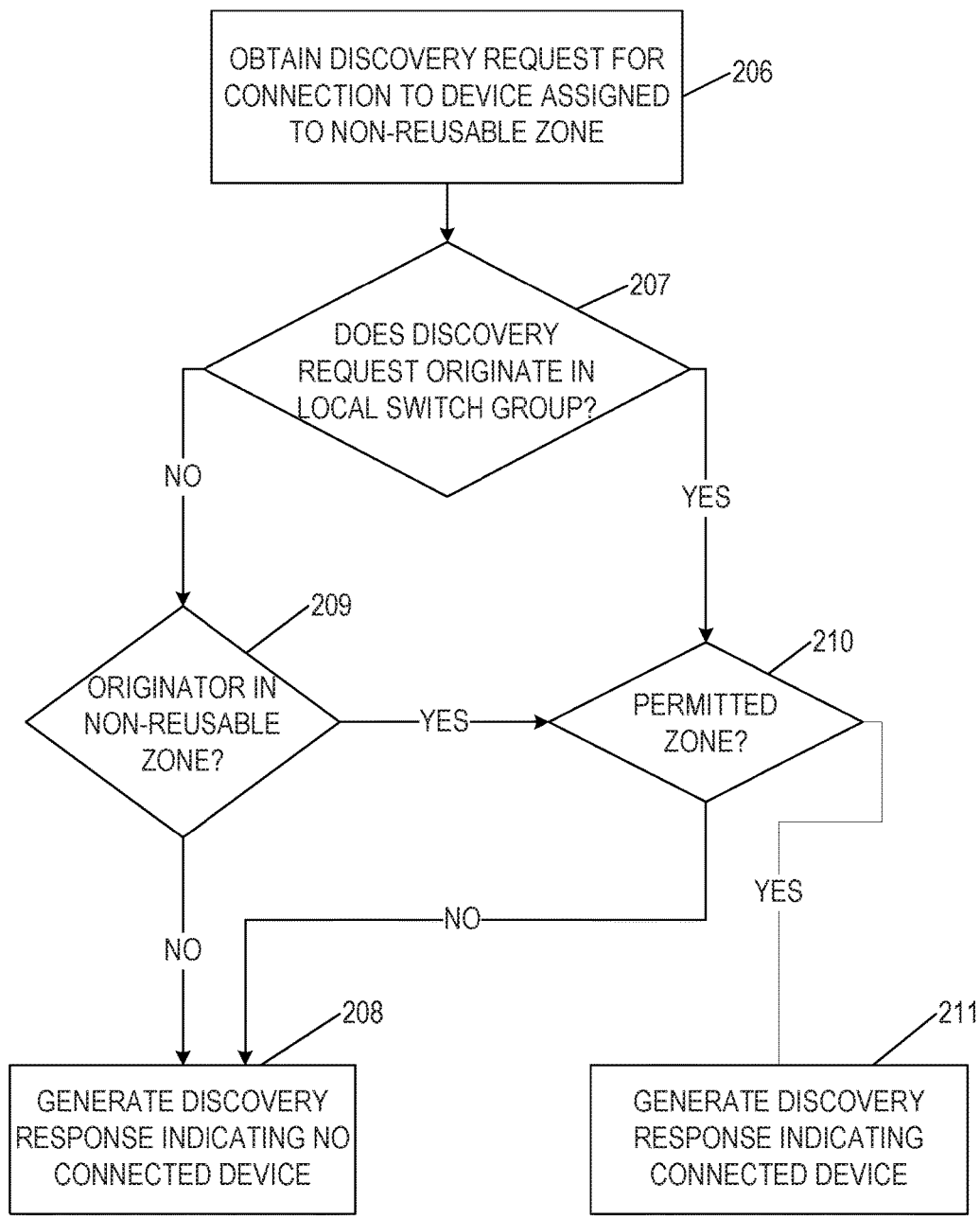
FIG. 2B illustrates an example method of providing a discovery response for a device assigned to a non-reusable zone.

FIG. 2B illustrates an example method of providing a discovery response for a device assigned to a non-reusable zone. For example, a switch in a network fabric may perform the example method illustrated in FIG. 2A after receiving a discovery response for a device in a reusable zone and may perform the example method illustrated in FIG. 2B after receiving a discovery response for a device in a non-reusable zone.

Block 206 of the example method may include obtaining a second discovery request originating from a second device for a second connection to a third device assigned to a non-reusable zone. For example, in a SAS fabric, an expander may perform block 206 by receiving a Serial Management Protocol (SMP) DISCOVER request for a second PHY connected to a third device assigned to a non-reusable zone. As another example, a switch may perform block 201 by receiving a second discovery request for a second port connected to a third device assigned to a non-reusable zone.

Block 207 of the example method may include determining if the second discovery request originates in the local switch group. For example, in a SAS fabric, an expander may determine if the second discovery request was transmitted by a second initiator device connected to another expander in the local switch group. In some implementations, block 207 may be performed in a manner similar to block 202. For example, the switch may use the switch group map to perform block 207.

If the second discovery request originates from a second device connected to the local switch group, the method may proceed to block 210. In block 210 the switch may determine if the second device is in a permitted zone permitted to access the non-reusable zone. In some implementations, block 210 may be performed in a manner similar to block 203. For example, an expander may use a permission table to determine if the second device is in a zone permitted to access the non-reusable zone.

If the second device is in a permitted zone, then the method may proceed to block 211. In block 211, the switch may generate a discovery response indicating that the third device is connected at the second connection. In some implementations, block 211 may be performed in a manner similar to block 205. For example, an expander may response with an SMP DISCOVER RESPONSE frame with information regarding the PHY and the device in the non-reusable zone that is attached to the PHY.

If the second device is not in a permitted zone, then the method may proceed to block 208. In block 208, the switch may generate a discovery response that indicates that there is no device at the second connection. In some implementations, block 208 may be performed in a manner similar to block 204. For example, an expander may return a NO DEVICE ATTACHED message for the second PHY.

If the discovery request does not originate in the local switch group, the method may proceed to block 209. Block 209 may include determining if the second device is assigned to a non-reusable zone. For example, a switch may use a listing of the reusable zones and the non-reusable zones to determine if the second device is assigned to a non-reusable zone.

If the second device is assigned to a non-reusable zone, then the method may proceed to block 210. In block 210, the switch may determine if the second device is in a permitted non-reusable zone that is permitted to access the non-reusable zone of the third device. If so, the method may proceed to block 211, to generate the second discovery request indicating that the third device is connected at the second connection.

If the second device is not in a permitted non-reusable zone, then the method may proceed to block 208. As described above, in block 208, the switch may generate a discovery response indicating that there is no device at the second connection. Similarly, if the second device is not in a non-reusable zone 209 (for example, if the second device is in a reusable zone), then the method may proceed to block 208.

Figure 3:
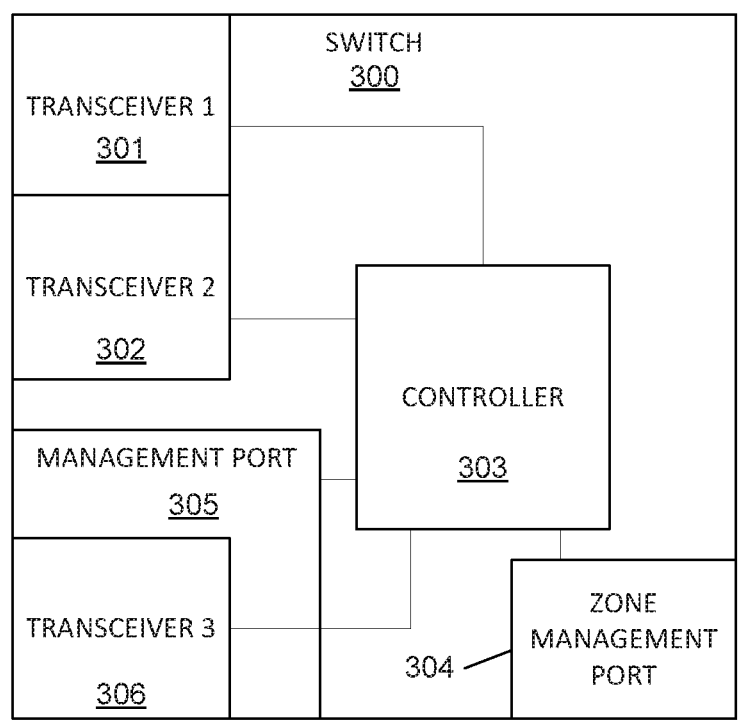
FIG. 3 illustrates an example switch including a controller to generate a discovery response to a discovery request for a device assigned to a reusable zone.

FIG. 3 illustrates an example switch 300 including a controller 303 to generate a discovery response to a discovery request for a device assigned to a reusable zone. For example, the example switch 300 may be a SAS expander.

The example switch 300 may include a first transceiver 301 to connect to a device assigned to a reusable zone. For example, the first transceiver 301 may comprise a physical or logical SAS expander PHY. The example switch 300 may include a second transceiver 302 to connect to a device assigned to a non-reusable zone. For example, the second transceiver 301 may comprise a second PHY.

The example switch 300 may also include a management port to receive a discovery request for the transceiver 301 and to transmit a discovery response. In some implementations, the management port 305 may include a third transceiver 306 to connect to a second switch. For example, the management port may be an SMP port formed using a third PHY. In this example, the discovery request and response may be SMP frames.

The example switch may include a controller 303 to generate the discovery response. In some implementations, if the discovery request does not originate from a local switch group, the discovery response may indicate that there is no attached device connected to the transceiver 301. For example, the discovery response may be a NO DEVICE ATTACHED frame corresponding to the requested PHY. In these implementations, if the discovery request originates from a second device connected to the local switch group and assigned to a zone permitted to access the reusable zone, then the discovery response may indicate that the device is connected to the transceiver 301. For example, the discovery response may be an SMP DISCOVER RESPONSE frame including information regarding the PHY and the attached device.

In some implementations, the management port 305 may receive a first switch group identification number. For example, the first switch group identification number may be assigned to the switch 300 during a network configuration. In these implementations, the controller 303 may determining whether the discovery request originates from the local switch group by determining if the discovery request originated from a second device connected to a peer switch that is assigned to a second switch group identification number. If the second switch group identification number is different from the first switch group identification number, the controller 303 may determine that discovery request does not originate from the local switch group.

In some implementations, the controller 303 may generate a map associating the second device with the second switch group identification number during a topology discovery process. Additionally, the controller 303 may use the map to determine if the discovery request originates form the local switch group.

In some implementations, the switch 300 may include a zone management port 304 to receive a list of reusable zones in a reusable zone group. In further implementations, the zone management port 304 may receive a list of non-reusable zones in a non-reusable zone groups. In some cases, the zone management port 304 may be an out-of-band network port. For example, in a SAS expander, the zone management port 304 may be an Ethernet port. In other cases, the zone management port 304 may be an in-band network port. For example, the zone management port 304 may be the management port 305. In these implementations, the controller 303 may use the list of reusable zones to determine that the device is assigned to the reusable zone.

In some implementations, the management port 305 may be to receive a second discovery request for the second transceiver 302. The second discovery request may originate from a third device connected to a non-local switch group. In these implementations, the management port 305 may be to transmit a second discovery response. Additionally, in these implementations, the controller 303 may generate the second discovery response.

If the third device is assigned to a reusable zone, such as the reusable zone assigned to the device connected to the first transceiver 301 or another reusable zone, then the second discovery response may indicate that there is no attached device connected to the second transceiver 302. If the third device is assigned to a non-reusable zone that is permitted to access the non-reusable zone of the device connected to the second transceiver 302, then the second discovery response may indicate that the second device is connected to the second transceiver 302. In some cases, the controller 303 may use the list of non-reusable zone to determine if the third device is assigned to the non-reusable zone.

Figure 4:
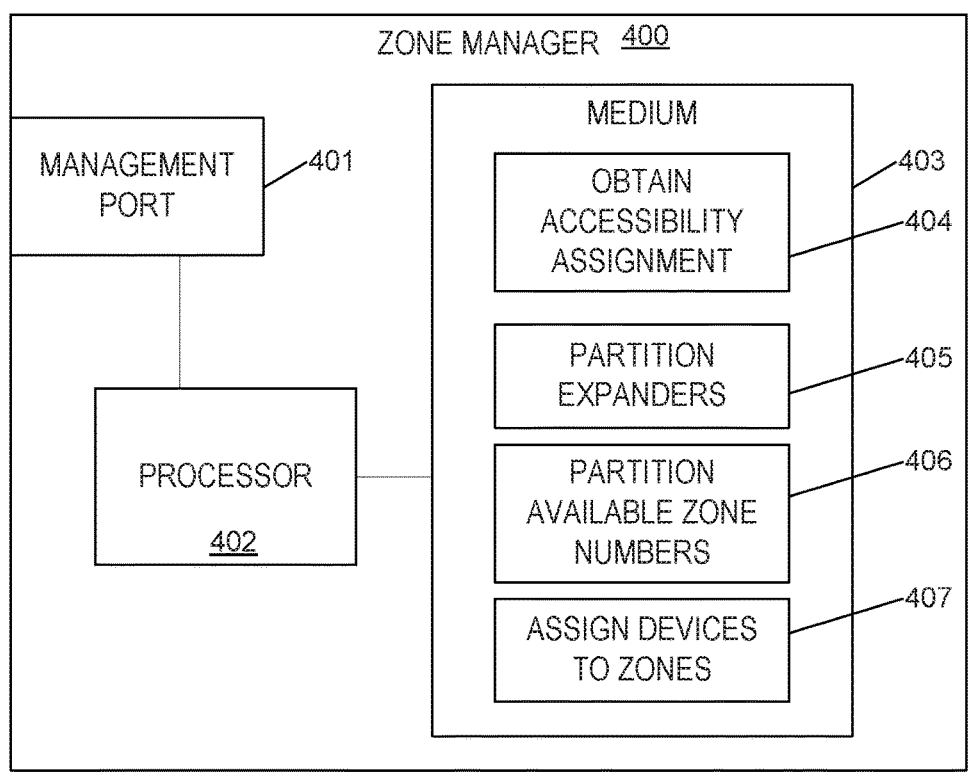
FIG. 4 illustrates an example zone manager including a non-transitory computer readable medium storing instructions for partitioning a network into switch groups, reusable zones, and non-reusable zones.

FIG. 4 illustrates an example zone manager 400 including a non-transitory computer readable medium 403 storing instructions for partitioning a network into switch groups, reusable zones, and non-reusable zones. For example, the zone manager 400 may be a computer usable be a network administrator to configure a network having reusable and non-reusable zones.

The zone manager 400 may include a process 402 and a non-transitory computer readable medium 403 storing instructions. For example, the medium 403 may include a non-volatile memory, such as storage or flash memory, volatile memory, such as random access memory (RAM), or a combination thereof.

The medium 403 may store instructions 404 that are executable by the processor 402 to obtain an accessibility assignment for a plurality of devices. For example, in a SAS network, the accessibility assignment may group targets and initiators into sets of devices permitted to communicate with each other. In some implementations, the accessibility assignment may be generated by a network administrator by assigning devices to a proxy zone set that includes more zones than are available in the network. In further implementations, the zone manager 400 may present an interface to the network administrator to allow the network administrator to generate the accessibility assignment.

The medium 403 may store instructions 405 that are executable by the processor 402 to use the accessibility assignment to partition a plurality of switches into a plurality of switch groups. For example, the processor 402 may use a management port 401 connected to a network to discover a network topology of a plurality of switches connecting the devices. For example, the processor 402 may use the management port 401 to obtain a topology of expanders in a SAS network. In other implementations, the network topology may be provided by the network administrator.

In some implementations, the instructions 405 are executable by the processor 402 to inspect the accessibility assignment to determine continuous switch groups that connect devices that communicate with each other and only with each other. These devices may be assigned to reusable zones that are local to their respective switch groups.

In some implementations, the instructions 405 are executable by the processor 402 to transmit switch group assignments to network switches. For example, the processor 402 may transmit assignments through the management port 401.

The medium 403 may also store instructions 406 that are executable by the processor 402 to partition a set of available zone numbers into a reusable zone number group and a non-reusable zone number group. In some implementations, the processor 402 may use the accessibility assignment and switch partition to determine the partition into the reusable zone number group and non-reusable zone number group. In some implementations, the partitions are not a complete partition of the set of available zone numbers. For example, a subset of the set of available zone numbers may be reserved. For example, the reserved zone numbers may be assigned to the reusable zone number group or non-reusable zone number group to accommodate network changes, such as adding devices to the network.

In some implementations, the instructions 406 are executable by the processor 402 to send a list of reusable zone numbers in the reusable zone number group to network switches. The instructions 406 may also be executable by the processor 402 to send a list of non-reusable zone numbers in the non-reusable zone number group to network switches. For example, the processor 402 may use the management port 401 to send the lists.

The medium 403 may also store instructions 407 executable by the processor 402 to assign a device to the reusable zone number group or the non-reusable zone number group. In some implementations, if a device connected to a switch group is assigned to the reusable zone number group, then the accessibility assignment indicates that the device is no accessibly by any device not connected to the switch group. In further implementations, if the device is assigned to the non-reusable zone group, then the accessibility assignment indicates that the device is not accessible by any device assigned to the reusable zone group that is not connected to the switch group. For example, in these implementations, devices in the reusable zone group can only contact devices in the same switch group.

In some implementations, the instructions 407 may be executable by the processor 402 to assign devices to the zone number groups by assigning zone numbers to the devices. For example, the instructions 403 may be executable to assign the first device to the reusable zone number group by assigning a reusable zone number to the first device. Additionally, the instructions 403 may be executable to assign the reusable zone number to a second device not connected to the switch group. In this case, the first and second device may be mutually inaccessible in the accessibility assignment. Accordingly, the reusable zone number may be used to designate different zones in different switch groups.

As another example, the instructions 407 may be executable by the processor 402 to assign a non-reusable zone number to the first device. In this example, the instructions 407 may be executable to assign the non-reusable zone number to a second device not connected to the switch group. In this example, the first and second device may be mutually accessible in the accessibility assignment. Accordingly, non-reusable zone groups may be used to designate zones that extend across the entire network.

In some implementations, the instructions 407 may be executable by the processor 402 to transmit the zone number assignments to the network devices and switches. For example, the processor 402 may use the management port 401 to transmit the zone number assignments.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
   obtaining a first discovery request for a first connection to a first device assigned to a reusable zone;
   generating a first discovery response, wherein if the first discovery request does not originate from a local switch group, the first discovery response indicates that there is no device at the first connection;
   obtaining a second discovery request originating from a second device for a second connection to a third device assigned to a non-reusable zone; and
   generating a second discovery response to the second discovery request, wherein if the second device is connected to the local switch group and is assigned to a permitted zone permitted to access the non-reusable zone, the second discovery response indicates that the third device is at the second connection.

2. The method of claim 1, wherein:
   if the first discovery request originates from a fourth device connected to the local switch group and assigned to a zone permitted to access the reusable zone, the first discovery response indicates that the first device is connected at the first connection.

3. The method of claim 1, wherein:
if the second device is not connected to the local switch group and is assigned to a permitted non-reusable zone permitted to access the non-reusable zone, the second discovery response indicates that the third device is at the second connection.

4. The method of claim 1, further comprising: using a map associating a fourth device transmitting the first discovery request with a switch group identification number to determine if the first discovery request does not originate from a local switch group.

5. The method of claim 2, wherein a zone permission table is used to determine if the fourth device is assigned to the zone permitted to access the reusable zone.

6. The method of claim 1, wherein obtaining the second discovery request is performed by an expander or a switch.

7. The method of claim 1, wherein if the second device is not connected to the local switch group and is not assigned to any non-reusable zone, the second discovery response indicates that there is no device at the second connection.

8. The method of claim 1, wherein if the first discovery request originates from a fourth device connected to the local switch group and is not assigned to a zone permitted to access the reusable zone, the first discovery response indicates that that there is no device at the first connection.

9. A switch, comprising:
a first transceiver to connect to a first device assigned to a reusable zone;
a second transceiver to connect to a second device assigned to a non-reusable zone;
a management port to receive a first discovery request for the first transceiver, and to transmit a first discovery response; and
a controller to generate the first discovery response;
wherein if the first discovery request does not originate from a local switch group, the first discovery response indicates that there is no attached device connected to the first transceiver;
wherein the management port is to receive a second discovery request for the second transceiver originating from a third device connected to a non-local switch group, and is to transmit a second discovery response; and
wherein the controller is to generate the second discovery response, wherein if the third device is assigned to the reusable zone or another reusable zone, the second discovery response indicates that there is no attached device connected to the second transceiver.

10. The switch of claim 9, wherein if the first discovery request originates from a fourth device connected to the local switch group and assigned to a permitted zone permitted to access the reusable zone, the first discovery response indicates that the first device is connected to the first transceiver.

11. The switch of claim 9, wherein:
if the third device is assigned to a permitted non-reusable zone permitted to access the non-reusable zone, the second discovery response indicates that the second device is connected to the second transceiver.

12. The switch of claim 9, further comprising:
a zone management port to receive a list of reusable zones in a reusable zone group; and the controller is to use the list to determine that the first device is assigned to the reusable zone.

13. The switch of claim 9, wherein:
the management port is to receive a first switch group identification number;
the controller is to determine whether the first discovery request does not originate from the local switch group by determining if the first discovery request originated from a fourth device connected to a peer switch having a second switch group identification number different from the first switch group identification number.

14. The switch of claim 13, wherein:
the controller is to generate a map associating the fourth device with the second switch group identification number during a topology discovery process and to use the map to determine if the first discovery request originates from the local switch group.

15. The switch of claim 11, further comprising a third transceiver to connect to a second switch.

16. The switch of claim 12, further comprising the zone management port to receive a list of non-reusable zones in a non-reusable zone group.

17. A non-transitory computer readable medium storing instructions executable by a processor to:
use an accessibility assignment for a plurality of devices to partition a plurality of switches connecting the plurality of devices into a plurality of switch groups; and
partition a set of available zone numbers into a reusable zone number group and a non-reusable zone number group; and
assign a device to the reusable zone number group or the non-reusable zone number group;
wherein, if the device is connected to a switch group and is assigned to the reusable zone number group, then the accessibility assignment indicates that the device is not accessible by any device not connected to the switch group.

18. The non-transitory computer readable medium of claim 17, wherein:
if the device is connected to the switch group and is assigned to the non-reusable zone number group, then the accessibility assignment indicates that the device is not accessible by any device assigned to the reusable zone number group and not connected to the switch group.

19. The non-transitory computer readable medium of claim 17, the instructions executable by the processor to:
assign a first device to the reusable zone number group by assigning a reusable zone number to the first device; and
assign the reusable zone number to a second device not connected to the switch group, the first and second device being mutually inaccessible in the accessibility assignment.

20. The non-transitory computer readable medium of claim 17, the instructions executable by the processor to:
assign a first device to the non-reusable zone number group by assigning a non-reusable zone number to the first device; and assign the non-reusable zone number to a second device not connected to the switch group, the first and second devices being mutually accessible in the accessibility assignment.

* * * * *